United States Patent
Reiter et al.

(10) Patent No.: US 6,384,835 B1
(45) Date of Patent: May 7, 2002

(54) COMPUTER GENERATED PAINT STAMP COMPENSATION

(75) Inventors: Jesse Chaim Reiter; Jonathan Shekter; Peter Liepa, all of Toronto (CA)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 09/024,122

(22) Filed: Feb. 17, 1998

(51) Int. Cl.⁷ .............................................. G06T 11/40
(52) U.S. Cl. ...................................... 345/582
(58) Field of Search ................................. 345/430, 423, 345/425, 419, 582, 584, 589, 420

(56) References Cited

U.S. PATENT DOCUMENTS 5,381,519 A * 1/1995 Brown et al. ................ 345/432
5,751,293 A    5/1998 Hashimoto et al. .......... 345/430
5,903,270 A * 5/1999 Gentry et al. ................ 345/419

OTHER PUBLICATIONS

Jesse Chaim Reiter, "Textured Surface Modeling Using Bezier Triangles", 1996.
News Release—"Alias/Wavefront Brings 3D Paint Technology To Gamers With StudioPaint 3D 4.0", Aug. 6, 1996.
Brochure—Studio Paint 3D—Proven in Production, 1997, Alias/Wavefront.
Abstract From the Collection of Computer Science Bibliographies, Bruce G. Baumgar, "Winged Edge Polyhedron Representation", Technical Report, Stanford University, Dept. of Computer Science, No. CS–TR–72–320, p. 54, Oct. 1972.

* cited by examiner

Primary Examiner—Mark Zimmerman
Assistant Examiner—Huedung X. Cao
(74) Attorney, Agent, or Firm—Staas & Halsey LLP

(57) ABSTRACT

A system that predistorts a computer generated paint stamp for paint being applied to a 3D computer model of an object. The predistortion is based on a difference in shape and orientation of a texture space polygon, to which the stamp is initially applied, and the corresponding world space target polygon of the model. Because the paint stamps often overlap several polygons of different shapes and orientations, the distortion compensation becomes a weighted average of the distortion compensation for the polygon under the stamp and its nearest neighbors.

12 Claims, 10 Drawing Sheets

STAMP APPEARS DISTORTED IN WORLD SPACE

UNDISTORTED STAMP IN TEXTURE SPACE

DESIRED SHAPE

DESIRED SHAPE IS SEEN ON SURFACE

PREDISTORTED STAMP IN TEXTURE SPACE

DESIRED STAMP

WORLD SPACE / TEXTURE SPACE

TEXTURE SPACE

WORLD SPACE

TEXTURE SPACE

WORLD SPACE

COMPUTER GENERATED PAINT STAMP COMPENSATION

CROSS REFERENCE TO RELATED APPLICATION

This application is related to U.S. application entitled Computer Generated Paint Stamp Seaming Compensation, having Silicon Graphics Inc. Ser. No. 09/024,127 by Reiter et al, filed concurrently herewith and incorporated by reference herein.

BACKGROUND OF THE INVENTION

1. Field of the Invention

The present invention is directed to the compensation of the electronic paint that an artist can apply to a computer based model and, more particularly, to the compensation of a paint stamp for the warping that occurs when the stamp, applied to a texture triangle, is warped, along with the triangle, to fit a model surface triangle.

2. Description of the Related Art

Computer generated three dimensional (3D) objects are typically comprised of polygons, typically triangles, of sufficiently small size that the surface of the model appears smooth. Surface detail (color, surface topology, reflectance, etc.) is applied to these smooth computer generated three-dimensional images by applying 2D images, known as textures, to the 3D models in a process called texture mapping. Much of the realism of the models is affected by these textures, and great care is therefore taken to produce the desired effects when painting the textures.

Digital paint is typically applied in brush strokes, with each stroke using a particular paint brush specified by the user. Various attributes of the brush must be specified before the brush can be used to produce a stroke. These attributes include, for example, the color of paint; the radius, aspect ratio, and rotational angle of the brush; and a detailed map specifying the amount of paint to be applied at each point in the brush. The collection of these attributes is called a brush stamp. Once the attributes are set, a digital image of the stamp is created: this is called the stamp image, or a stamp source image. Stamps can then be placed on a target image, such as a texture, by a copying the stamp image to various locations on the target. Paint brush strokes are typically applied by placing a sequence of consecutive stamps along the trajectory of a path as indicated by the user with a stylus or mouse pointer. The spacing between the stamps on the path determines the appearance of the stroke. Stamp spacing is typically another attribute specified by the user.

Paint may be applied to 3D models by either painting directly onto the flat texture, or by painting on the model. Although both are useful, only the latter method provides direct visual feedback as to the final appearance of the painted model.

Two methods are conventionally provided for painting in 3D: projective paint and surface paint. In projective painting, the paint is applied to a flat surface which is shaded and masked by the model in such a way that the paint appears to be applied directly to the surface. A separate projection step is then necessary to move the paint from this paint plane onto the various textures of the object.

The second 3D painting method is known as painting on the surface. In this approach, paint is applied directly onto the texture assigned to each surface. In particular, brush stamps are applied to the texture in a manner which is consistent with the conventional triangulated surface tessellation of computer based models. Stamps are centered at the world space position designated by the mouse or stylus pointer. That is, given a world space point in the interior of a surface triangle, the corresponding texture space point is found in the interior of the texture triangle assigned to it. The point in texture space is then used as the center of the stamp that it is to be placed. This gives rise to the problem illustrated in FIG. 1. As there is no inherent correlation between the size and orientation of the texture space and world space triangles, neighboring triangles may receive stamps that are identical in texture-space but whose appearances in world-space is greatly distorted. The circular stamp 2 of the desired shape in FIG. 1A when applied to the texture space triangle 4 in FIG. 1B is undistorted but when the texture space triangle 4 is mapped to the corresponding world space triangle 6, the stamp is distorted as depicted in FIG. 1C. These figures primarily depict shape and size distortion that occurs when the texture and world space triangles are of different shapes.

What is needed is a system that compensates for the shape and size distortion occurring when the paint stamp is transferred from texture space to world space.

Texture triangles in texture space, as noted above, often have an orientation that is not correlated with the orientation of the world space triangles. This lack of correlation causes rotational distortion This would not be a problem if all paint brushes and their stamps were circular but it is often the case that an electronic paint brush can have a non-circular shape associated with it.

What is needed is a system that preserves rotational coherence between polygons.

Distortion compensation as described herein is computed for each individual stamp before it is applied. However, the compensation compensates for a stamp which lies completely inside a single triangle. Unfortunately, this is seldom the case as stamps will generally overlap several triangles whose individual distortions differ, thus giving the stroke a very jagged appearance.

What is needed is a method of compensating for the differences in distortion caused by different triangles.

SUMMARY OF THE INVENTION

It is an object of the present invention to apply paint to world space objects in a manner such that the individual stamps are not distorted.

It is another object of the present invention to compensate a paint stamp before it is applied to a texture surface so that when it is transferred from texture space to world space the stamp shape appears as the artist would expect.

It is also an object of the present invention to provide a consistent coordinate frame that prevents rotational distortion, so that when the stamp is transferred from texture space to world space, the orientation of the stamp remains consistent.

It is a further object of the present invention to compensate for the distortions that can be caused by the paint stamp covering more than one polygon.

It is a further object of the present invention to provide a consistent set of distortion compensations, so that the individual stamps comprising a brush stroke will vary smoothly along the trajectory of the stroke, and embody it with a smooth appearance irrespective of the polygons affected by it.

The above objects can be attained by a system that predistorts a paint stamp using the difference in shape between the texture polygon and the world space target polygon before it is applied to a texture space surface. To preserve rotational invariance, a consistent coordinate frame is chosen for each surface within which the mapping between texture space and world space polygons occurs. The distortion compensation for a particular stamp inside a particular texture space polygon becomes a weighted average of the distortions of the target polygon and those of its three nearest neighbors.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1C:
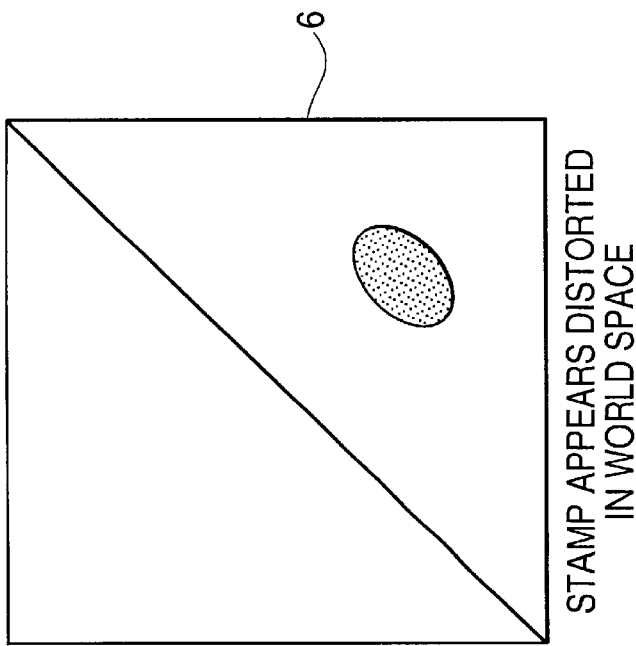
FIGS. 1A–1C depict distortion of a paint stamp when it is transferred from texture space to world space.
Figure 1B:
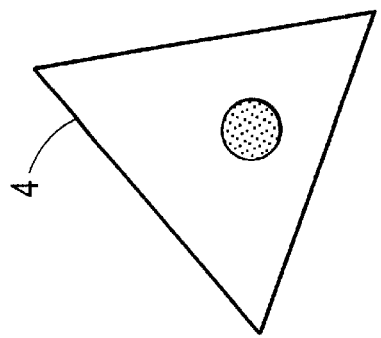
Figure 1A:
Figure 2C:
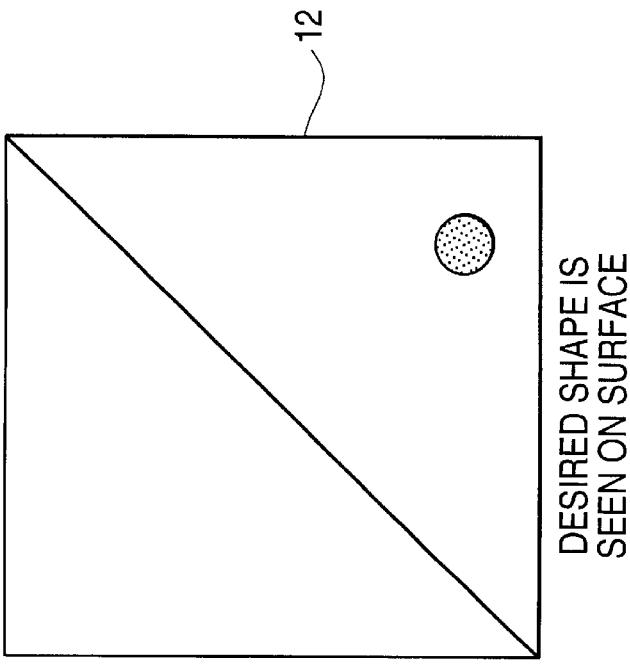
FIGS. 2A–2C illustrate predistortion that results in a correctly appearing stamp in world space.
Figure 2B:
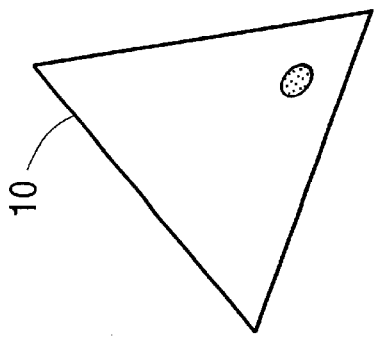
Figure 2A:

Computer generated paint stamps are distorted when texture triangles are warped to fit the corresponding world space triangles on a model surface. By judiciously stretching and rotating each stamp before it is applied to the texture space triangle, the overall effect of this warping can be nullified, thus producing identical looking stamps in world-space. This process is called stamp compensation. The present invention predistorts the stamp before it is applied to the texture space by essentially creating a distorted texture surface by stretching, warping, compressing, etc. the target texture space triangle, as if it were made of rubber, into the shape of the corresponding world space triangle, applying the stamp to that distorted texture surface and allowing the surface including the stamp to snap back to the shape of the original texture space triangle. As illustrated in FIGS. 2A–2C a desired paint stamp 8 (FIG. 2A) is predistorted and applied to a texture space triangle 10 (FIG. 2B) and then mapped to the desired world space surface triangle 12 (FIG. 2C).

Figure 3:
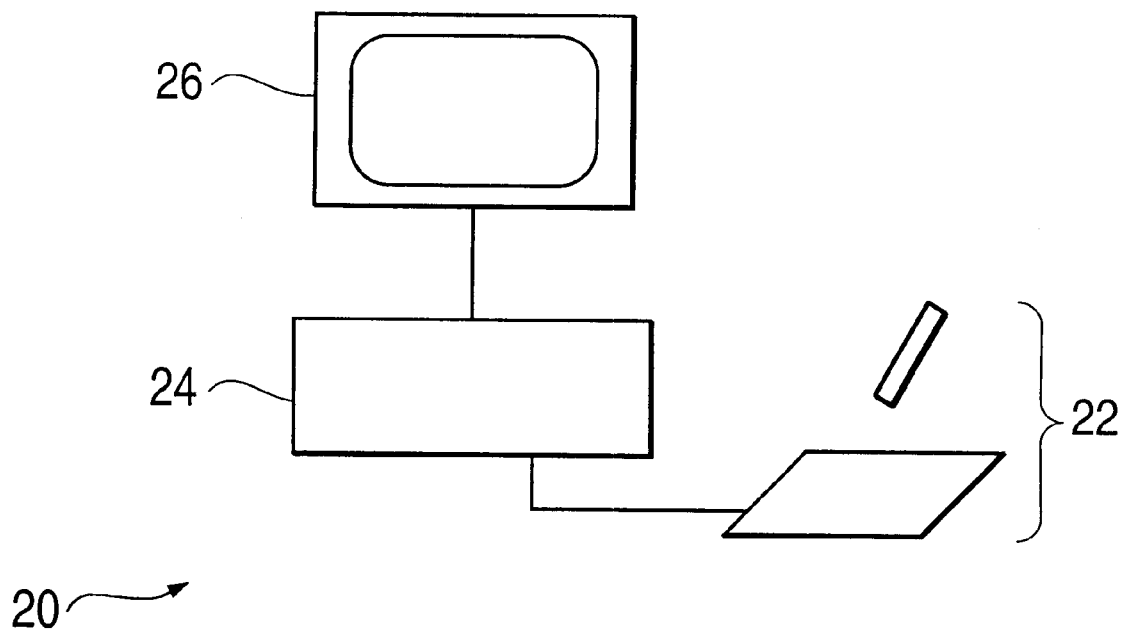
FIG. 3 shows a system according to the present invention.

The present invention is preferably implemented in a computer system 20, as depicted in FIG. 3. An input device 22, such as a stylus and tablet available from WACOM, capable of providing inputs for a paint program is coupled to a computer 24 and display 26, such as an O2 available from Silicon Graphics, Inc. Of course other input devices, such as a mouse, and other computers, such as a personal computer, could be used. As the input device 22 is moved, paint is applied to a model displayed on display 26 by computer 24. The individual brush stamps comprising this paint are compensated for the changes in shape, size and orientation of the texture space triangles and world space triangles used by the system to apply the paint to the model.

Figure 4:
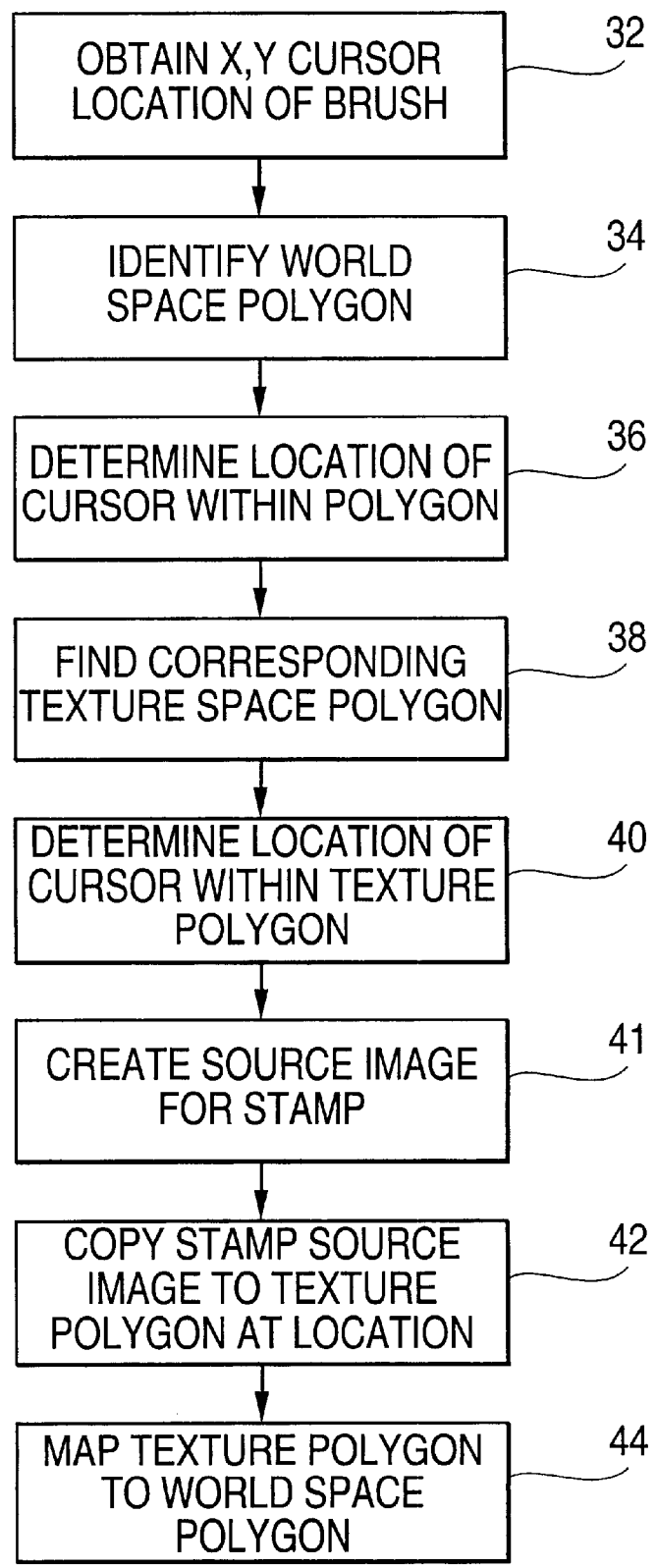
FIGS. 4 and 6 depict the operations of the present invention.
Figure 6:
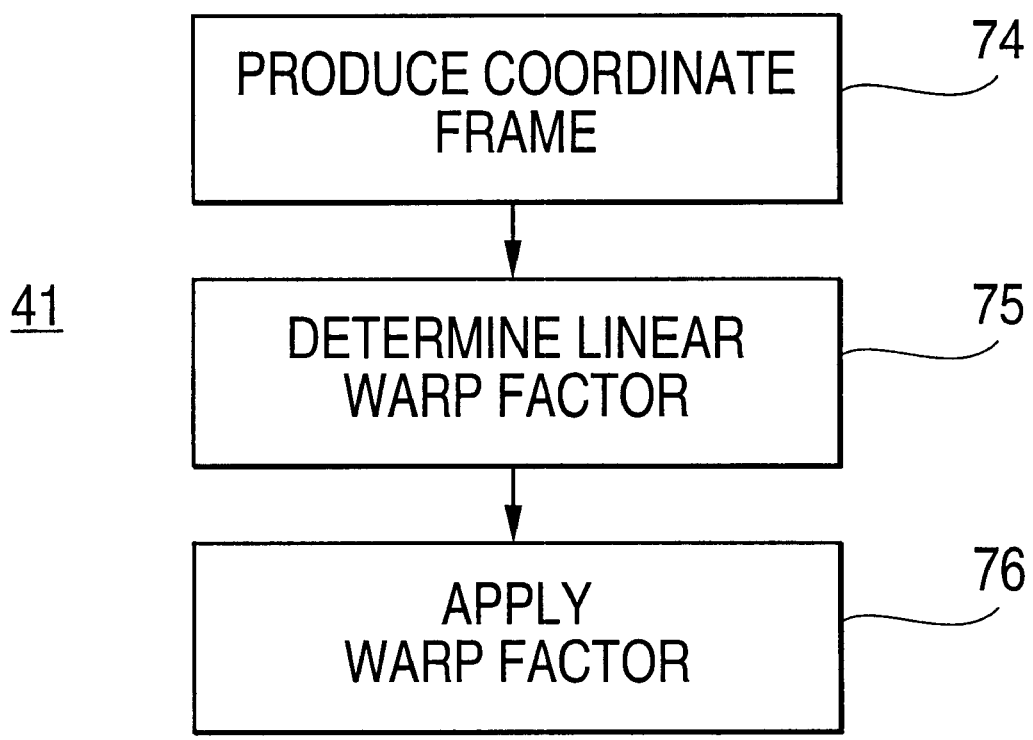

The process of applying a paint stamp to a model, as illustrated in FIG. 4, starts with obtaining 32 the cursor location as specified by the input device or paint brush. A stamp is typically placed on the model each time an input event occurs indicating that the brush has moved to a new location. The world space 3D triangle (polygon) under of the location of the cursor is identified 34 and the location of the cursor within the triangle is also determined 36. Each world space triangle has a corresponding two dimensional (2D) texture space triangle (polygon) mapped to it and the corresponding texture space triangle is found 38 and the cursor location within the texture space triangle is determined 40. Next, a source image is created 41 for the paint stamp. This step 41 involves the predistortion of the stamp before it is copied from the source to the texture triangle, which will be discussed in more detail with respect to FIG. 6. Once the stamp image has been created, it is copied to the texture triangle at the location of the cursor 42. After the paint stamp has been applied to the appropriate texture space triangles, the texture of the texture triangles is mapped 44 to the corresponding world space triangles, completing the painting process.

As previously mentioned the paint applied to a model is distorted when texture triangles are warped to fit the corresponding world space triangles. By predistorting the image of each stamp before it is copied to the texture triangle, the warping is removed or nullified producing identical looking stamps in world-space.

Figure 5:
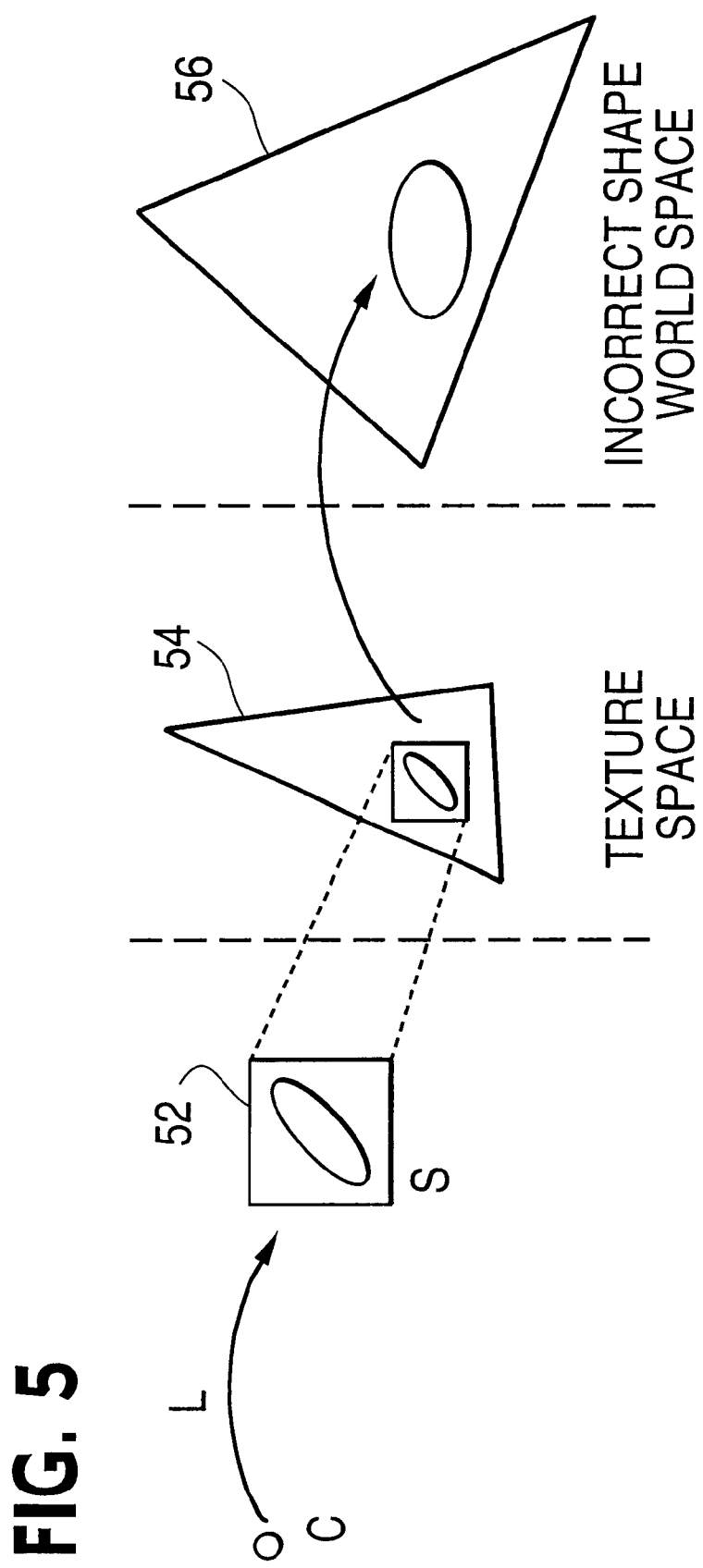
FIG. 5 depicts an incorrect mapping.

When generating each stamp image 52 (see FIG. 5), each stamp is considered as a planar linear transformation L, mapping the unit circle, C, to some ellipse S. Nominally, all a stamp generator must do is apply L to the unit circle to produce S: if a point p is inside C then Lp is in the ellipse S, and the pixel corresponding to Lp is drawn in the stamp image 52. The stamp image is then copied to the texture space triangle 54, as depicted in FIG. 5. However this produces the incorrect shape in the world space triangle 56.

Figure 7:
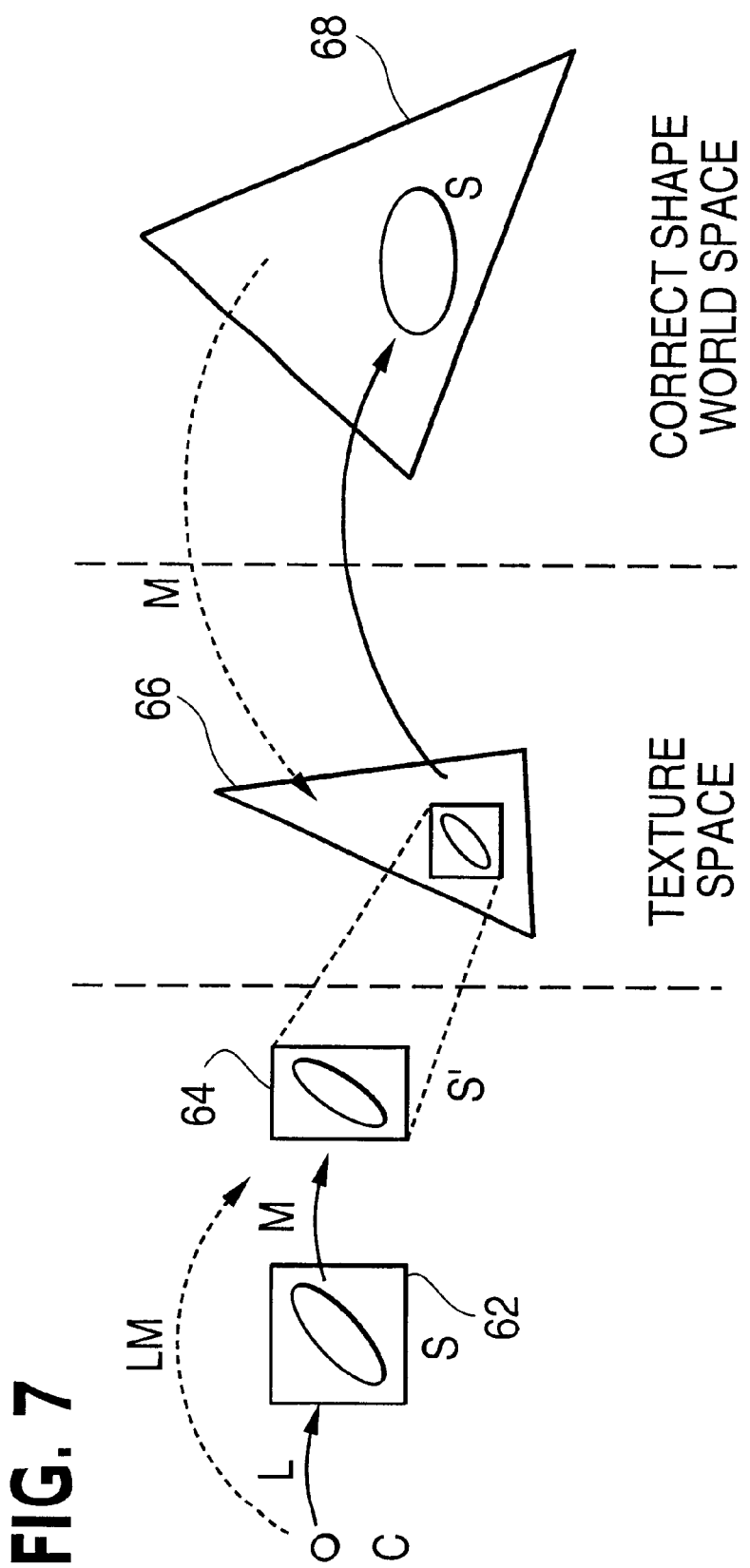
FIG. 7 illustrates a distortion corrected mapping.

Distortion compensation is achieved by producing or determining 75 (see FIG. 6) the appropriate linear warp factor M (see FIG. 7), which post-multiplies L to produce LM. The unit circle is thus transformed by L into the desired shape, S, which would produce the image 62 and is then warped by M into a new shape, S', which produces the distorted stamp image 64. This image is copied to the texture triangle 66. When the texture triangle is mapped onto the world space surface triangle 68 by the texturing facilities of the system, the shape S' is transformed back into the desired shape S (see FIG. 7). In this way, each stamp is placed on the object in such a way as if the paintbrush were always normal to the surface.

Figure 8:
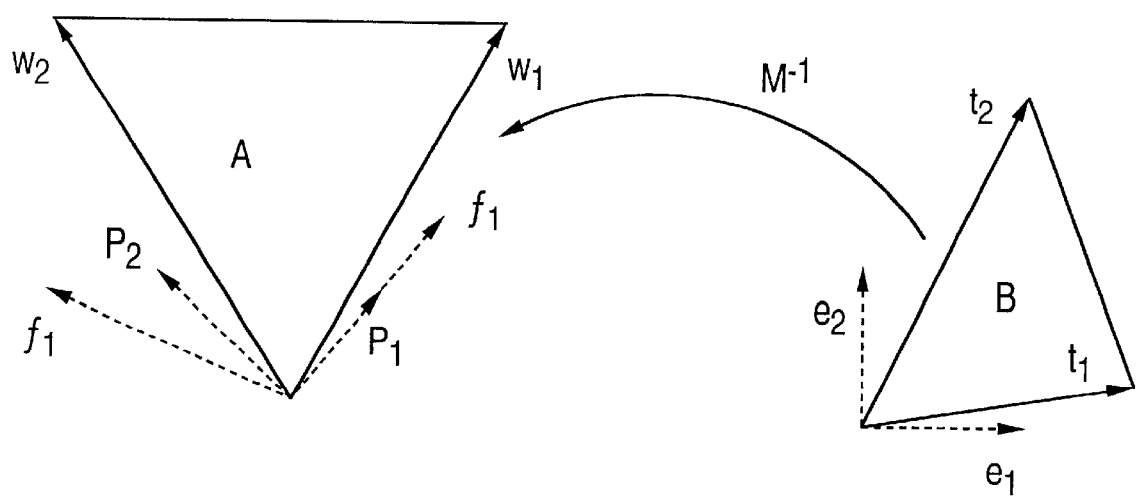
FIG. 8 depicts how rotational invariance is preserved.

The appropriate linear transformation M (see FIG. 8) is the one that sends the three vertices of the world space triangle, A, to those of the corresponding texture-space triangle, B. It is produced in the following fashion. Assuming M is affine, it is uniquely determined by a non-degenerate triangle and its image. Thus, if $t_1, t_2$ are the directed edges of B, and $w_1, w_2$ are the corresponding ones in A, then M is found by solving:

$$Mw_i = t_i, i=1,2 \qquad (1)$$

as depicted in FIG. 8. More concisely, put $T=(t_1,t_2)$, meaning the matrix with columns $t_1$ and $t_2$, and put $W=(w_1,w_2)$. Then equation 1 states that MW=T and therefore:

$$M = TW^{-1} \quad (2)$$

In order to solve equation 2, $w_1$ and $w_2$ must be represented as planar vectors in the plane defined by A, as opposed to being represented as 3D vectors. One way to do this is to construct a planar orthonormal frame $P=\{p_1,p_2\}$ out of the $w_i$'s:

$$p_1 = \frac{w_1}{\|w_1\|} \quad (3)$$

$$p_2 = \frac{(w_1 \wedge w_2) \wedge w_1}{\|(w_1 \wedge w_2) \wedge w_1\|}, \quad (4)$$

where the wedge "$\wedge$" denotes the vector cross product. In this frame, the world space vectors are:

$$w'_1 = (w_1 \cdot p_1, w_1 \cdot p_2) = (\|w_1\|, 0) \quad (5)$$

$$w'_2 = (w_2 \cdot p_1, w_2 \cdot p_2). \quad (6)$$

Putting $W'=(w'_1,w'_2)$ and substituting it for W in equation 2 will produce the required M.

Unfortunately, the embedded frame P depends completely on the orientation of A, and therefore varies from triangle to triangle. To preserve rotational coherence between adjacent polygons, a consistent coordinate frame must be chosen. To do this, the world space triangle is essentially rotated in space into planar coincidence with the texture space triangle while keeping the origin fixed. The following method produces 74 (see FIG. 6) a 2D frame coplanar with A in such a way that the orientation of A matches that of B. Assuming B (and A) are non-degenerate, the vectors $t_1,t_2$ span the plane embodying B, which means that every point in that plane can be specified as a barycentric combination of these vectors. Specifically, the standard basis vectors $\{e_1,e_2\}$ can be specified in terms of $t_1,t_2$. Let $s_1=(s_{11},s_{12})$ be the barycentric coordinates of $e_1$ with respect to the $t_i$'s (i.e., $e_1=s_{11}t_1+s_{12}t_2$), and let $s_2=(s_{21},s_{22})$ be those of $e_2$. Now let the vectors $f_1,f_2$ be those with barycentric coordinates $s_1,s_2$ with respect to the edges of A: $f_i=s_{i1}w_1+s_{i2}w_2$, (i=1,2). Using the method described in equations 3 and 4, produce an orthonormal frame $Q=\{q_1,q_2\}$ from $\{f_1,f_2\}$:

$$q_1 = \frac{f_1}{\|f_1\|} \quad (7)$$

$$q_2 = \frac{(f_1 \wedge f_2) \wedge f_1}{\|(f_1 \wedge f_2) \wedge f_1\|} \quad (8)$$

Finally, put $f'_1,f'_2$ as the vectors corresponding to $f_i$'s in the $\{q_1,q_2\}$ basis, as in equations 5 and 6:

$$f'_1 = (f_1 \cdot q_1, f_1 \cdot q_2) = (\|f_1\|, 0) \quad (9)$$

$$f'_2 = (f_2 \cdot q_1, f_2 \cdot q_2) \quad (10)$$

By definition M is linear and is therefore uniquely determined by mapping $w_i$ to $t_i$. Since barycentric combinations preserve linearity it is therefore true that $Mf'_1=e_1=(1,0)$ and $Mf'_2=e_2=(0,1)$. Putting $F'=(f'_1,f'_2)$, we have that:

$$MF' = \begin{pmatrix} 1 & 0 \\ 0 & 1 \end{pmatrix} = I, \quad (11)$$

and therefore, $$M = F'^{-1} \quad (12)$$

as depicted in FIG. 8.

The actual computation of $\{f_1,f_2\}$ is straight forward. Put $$T' = T^t = \begin{pmatrix} t_1 \\ t_2 \end{pmatrix} = \begin{pmatrix} t_{11} & t_{12} \\ t_{21} & t_{22} \end{pmatrix}, \quad (13)$$

the change of basis matrix between the standard 2D basis $\{e_1,e_2\}$ and the basis $\{t_1,t_2\}$. Each row of T' represents a new basis vector as a linear combination of the old ones. The matrix $S=T'^{-1}$ is the change of basis matrix from $\{t_1,t_2\}$ to the standard basis. Its rows, therefore, represent the standard basis as linear, or barycentric combinations of $t_1$ and $t_2$. Thus $$e_1 = s_{11}t_1 + s_{12}t_2, \text{ and} \quad (14)$$

$$e_2 = s_{21}t_1 + s_{22}t_2, \quad (15)$$

Applying M to both sides in equations 14 and 15 produces:

$$f_1 = s_{11}w_1 + s_{12}w_2, \text{ and} \quad (16)$$

$$f_2 = s_{21}w_1 + s_{22}w_2. \quad (17)$$

Once the coordinate frame is known, the warp factor is computed 75 and applied 76 (see FIG. 6) to the stamp to create the stamp source image before it is copied to the texture surface.

Figure 9:
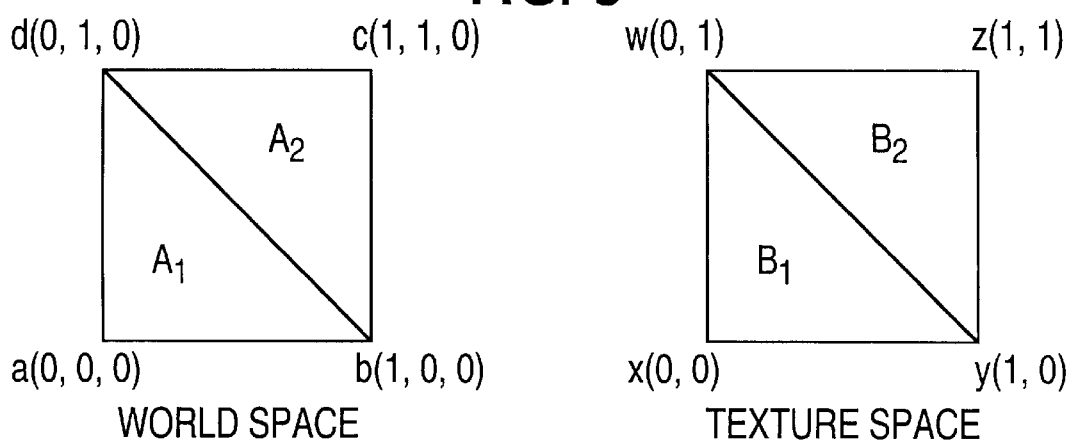
FIG. 9 shows triangles used in a numerical example.

To provide an example of computing the warp factor, numerical examples are provided below for two sets of triangles as depicted in FIG. 9. The examples will discuss the development of the warp factor matrix when only shape compensation is performed and when both shape and rotation compensation are performed. In FIG. 9, 2D texture triangle $B_1(x,y,w)$ maps to 3D world space triangle $A_1(a,b,d)$ and texture triangle $B_2(w,y,z)$ maps to world space triangle $A_2(d,b,c)$. For simplification, the texture triangles are identical to the world space triangles, but the process is the same for non-identical triangles where the coordinates of the vertices change.

For triangles $B_1, A_1$ we have the following:

$$t1 = y - x = (1,0) - (0,0) = (1,0) \quad (18)$$

$$t2 = w - x = (0,1) - (0,0) = (0,1) \quad (19)$$

$$w1 = b - a = (1,0,0) - (0,0,0) = (1,0,0) \quad (20)$$

$$w2 = d - a = (0,1,0) - (0,0,0) = (0,1,0) \quad (21)$$

When there is no rotational compensation for mapping triangle $B_1$ to triangle $A_1$, the warp factor matrix M is computed as follows:

$$T = \begin{pmatrix} 1 & 0 \\ 0 & 1 \end{pmatrix} \quad (22)$$

The coordinate frame P is:

$$p_1 = \frac{w_1}{\|w_1\|} = \frac{(1,0,0)}{1} = (1,0,0) \quad (23)$$

$$(w_1 \wedge w_2) \wedge w_1 = (0,0,1) \wedge w_1 = (0,1,0) \quad (24)$$

$$p_2 = \frac{(0,1,0)}{1} = (0,1,0) \quad (25)$$

W' is computed as $$w'_1 = (w_1 \cdot p_1, w_1 \cdot p_2) = (1,0)$$

$w'_2=(w_2 \cdot p_1, w_2 \cdot p_2)=(0,1)$ (26)

$$\therefore W' = \begin{pmatrix} 1 & 0 \\ 0 & 1 \end{pmatrix}$$ (27)

Therefore $$W'^{-1} = \begin{pmatrix} 1 & 0 \\ 0 & 1 \end{pmatrix},$$

and the warp factor M is $$M = TW'^{-1} = \begin{pmatrix} 1 & 0 \\ 0 & 1 \end{pmatrix} = \text{identity}$$ (28)

When there is rotation compensation along with shape compensation for mapping triangle $B_1$ to triangle $A_1$, the warp factor matrix M is computed as follows:

$$T' = \begin{pmatrix} 1 & 0 \\ 0 & 1 \end{pmatrix} \text{ so } T'^{-1} = \begin{pmatrix} 1 & 0 \\ 0 & 1 \end{pmatrix} \text{ and } S = T'^{-1} = \begin{pmatrix} 1 & 0 \\ 0 & 1 \end{pmatrix}.$$ (29)

Therefore, $f_1 = 1 \cdot w_1 + 0 \cdot w_2 = (1,0,0)$ (30)

$f_2 = 0 \cdot w_1 + 1 \cdot w_2 = (0,1,0)$ (31)

$$q_1 = \frac{f_1}{\|f_1\|} = \frac{(1,0,0)}{1} = (1,0,0)$$ (32)

$(f_1 \hat{} f_2) \hat{} f_1 = (0,0,1) \hat{} f_1 = (0,1,0)$ (33)

$$q_2 = \frac{(0,1,0)}{1} = (0,1,0)$$ (34)

F' is computed as:

$$\begin{aligned} f'_1 &= (f_1 \cdot q_1, f_1 \cdot q_2) = (1,0) \\ f'_1^2 &= (f_2 \cdot q_1, f_2 \cdot q_2) = (0,1) \end{aligned} \text{ so } F' = \begin{pmatrix} 1 & 0 \\ 0 & 1 \end{pmatrix}$$ (35)

The warp factor M is therefore $$\therefore M = F'^{-1} = \begin{pmatrix} 1 & 0 \\ 0 & 1 \end{pmatrix} = \text{identity}$$ (36)

Figure 10A:
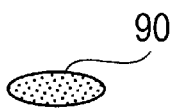
FIGS. 10A–10F show the results of mapping with shape correction and with shape plus rotation correction.
Figure 10B:
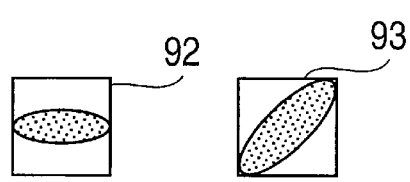

In order to draw stamp 90 such as illustrated in FIG. 10A on world space triangle $A_1$ (see FIG. 9), a stamp image 92 in FIG. 10B is created. Since the identical warp factor is used when compensating for shape and rotation as is used when compensating for shape only, the pre-warped stamp image created for both will be the one 92 in FIG. 10B. This image is then copied to triangle 94 in FIG. 10C and 106 in FIG. 10E. When texture triangles 94 and 106 are mapped to world space triangles 98 and 102 respectively, the stamps appear correctly.

For triangle $B_2, A_2$ we have the following:

$t1 = y - w = (1,0) - (0,1) = (1,-1)$ (37)

$t2 = z - w = (1,1) - (0,1) = (1,0)$ (38)

$w1 = b - d = (1,0,0) - (0,1,0) = (1,-1,0)$ (39)

$w2 = c - d = (1,1,0) - (0,1,0) = (1,0,0)$ (40)

When there is no rotational compensation for mapping triangle $B_2$ to triangle $A_2$, the warp factor M is computed as follows:

$$T = \begin{pmatrix} 1 & 1 \\ -1 & 0 \end{pmatrix}$$ (41)

The coordinate frame P is:

$$p_1 = \frac{w_1}{\|w_1\|} = \frac{(1,-1,0)}{\sqrt{2}} = \left(\frac{1}{\sqrt{2}}, \frac{-1}{\sqrt{2}}, 0\right)$$ (42)

$(w_1 \hat{} w_2) \hat{} w_1 = (0,0,1) \hat{} w_1 = (1,1,0)$ (43)

$$p_2 = \frac{(1,1,0)}{\sqrt{2}} = \left(\frac{1}{\sqrt{2}}, \frac{1}{\sqrt{2}}, 0\right)$$ (44)

W' is computed as:

$$w'_1 = (w_1 \cdot p_1, w_1 \cdot p_2) = \left(\frac{2}{\sqrt{2}}, 0\right)$$ (45)

$$w'_2 = (w_2 \cdot p_1, w_2 \cdot p_2) = \left(\frac{1}{\sqrt{2}}, \frac{1}{\sqrt{2}}\right)$$

$$\text{so } W' = \begin{pmatrix} \frac{2}{\sqrt{2}} & \frac{1}{\sqrt{2}} \\ 0 & \frac{1}{\sqrt{2}} \end{pmatrix}$$

Therefore $$W'^{-1} = \begin{pmatrix} \frac{2}{\sqrt{2}} & \frac{-1}{\sqrt{2}} \\ 0 & \frac{2}{\sqrt{2}} \end{pmatrix}$$ (46)

and the warp factor M is:

$$M = TW'^{-1} \begin{pmatrix} 1 & 1 \\ -1 & 0 \end{pmatrix} \begin{pmatrix} \frac{1}{\sqrt{2}} & -\frac{1}{\sqrt{2}} \\ 0 & \frac{2}{\sqrt{2}} \end{pmatrix}$$ (48)

$$= \begin{pmatrix} \frac{1}{\sqrt{2}} & \frac{1}{\sqrt{2}} \\ -\frac{1}{\sqrt{2}} & \frac{1}{\sqrt{2}} \end{pmatrix}$$ (49)

$$= \text{Rotation by } 45°, \text{ then uniform scale by } \frac{1}{\sqrt{2}}$$ (50)

When there is rotation compensation along with shape compensation for the triangle $B_2$ to triangle $A_2$ the warp factor M is computed as follows:

$$T' = \begin{pmatrix} 1 & -1 \\ 1 & 0 \end{pmatrix} \quad \text{and} \quad S = T'^{-1} = \begin{pmatrix} 0 & 1 \\ -1 & 1 \end{pmatrix} \quad (51)$$

Therefore, $$f_1 = 0 \cdot w_1 + 1 \cdot w_2 = (1,0,0) \quad (52)$$

$$f_2 = -1 \cdot w_1 + 1 \cdot w_2 = (0,1,0) \quad (53)$$

The coordinate frame Q is:

$$q_1 = \frac{f_1}{\|f_1\|} = \frac{(1,0,0)}{1} = (1,0,0) \quad (54)$$

$$(f_1 \hat{} f_2) \hat{} f_1 = (0,0,1) \hat{} f_1 = (0,1,0) \quad (55)$$

$$q_2 = \frac{(0,1,0)}{1} = (0,1,0) \quad (56)$$

F' is computed as:

$$f'_1 = (f_1 \cdot q_1, f_1 \cdot q_2) = (1,0)$$

$$f'_2 = (f_2 \cdot q_1, f_2 \cdot q_2) = (0,1) \quad (57)$$

$$\text{so } F' = \begin{pmatrix} 1 & 0 \\ 0 & 1 \end{pmatrix} \quad (58)$$

The warp factor M is therefore $$M = F'^{-1} = \begin{pmatrix} 1 & 0 \\ 0 & 1 \end{pmatrix} = \text{identity} \quad (59)$$

Figure 10C:
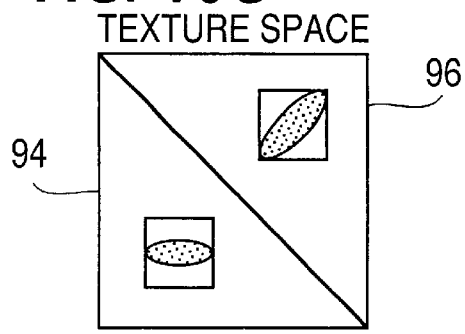
Figure 10D:
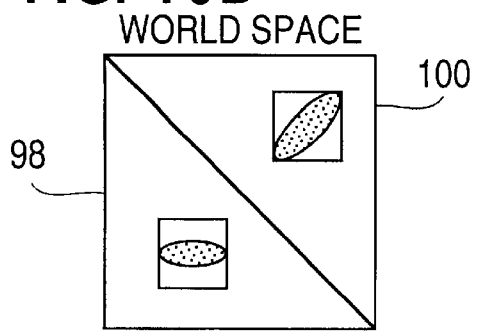
Figure 10E:
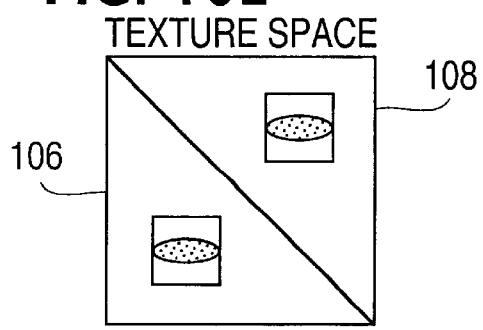
Figure 10F:
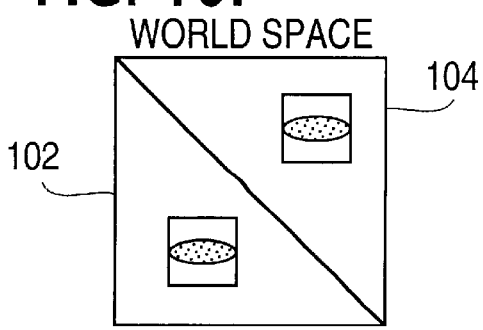

In order to draw stamp 90 such as illustrated in FIG. 10A on world space triangle $A_2$, a stamp image must be created. Stamp image 93 as shown in FIG. 10B is created when shape compensation but no rotational compensation is taken into account. However, when rotational compensation and shape compensation are both taken into account, stamp image 92 as shown in FIG. 10B is created. These images are then copied to texture triangles 96 (image 93) and 108 (image 92) in FIG. 10C and 10E, respectively. When texture triangle 96 in FIG. 10C is mapped onto world space triangle 100 in FIG. 10D, the stamp shows up incorrectly. However, when texture triangle 108 in FIG. 10E is mapped onto world-space triangle 104 in FIG. 10F, the appearance of the stamp is correct.

As previously mentioned, a brush stroke consists of a sequence of consecutive stamps applied to the surface. Distortion compensation must be computed for each individual stamp before it is applied. The warp factor matrix M, however, compensates for a stamp which lies completely inside a single triangle. Unfortunately, this is seldom the case as stamps will generally overlap several triangles whose individual distortions differ, thus giving the stroke a very jagged appearance. The problem may be overcome by using weighted stamp compensation.

For each stamp, the distortion matrix used is the weighted "butterfly" or cross average of the matrices of the target polygon and that of its neighbors. As the stroke moves across a polygon, the next polygon along the path is given ever increasing influence on the current distortion. The stamp shape is thus gradually distorted from one polygon to the next, smoothing out the appearance of the stroke.

Figure 11:
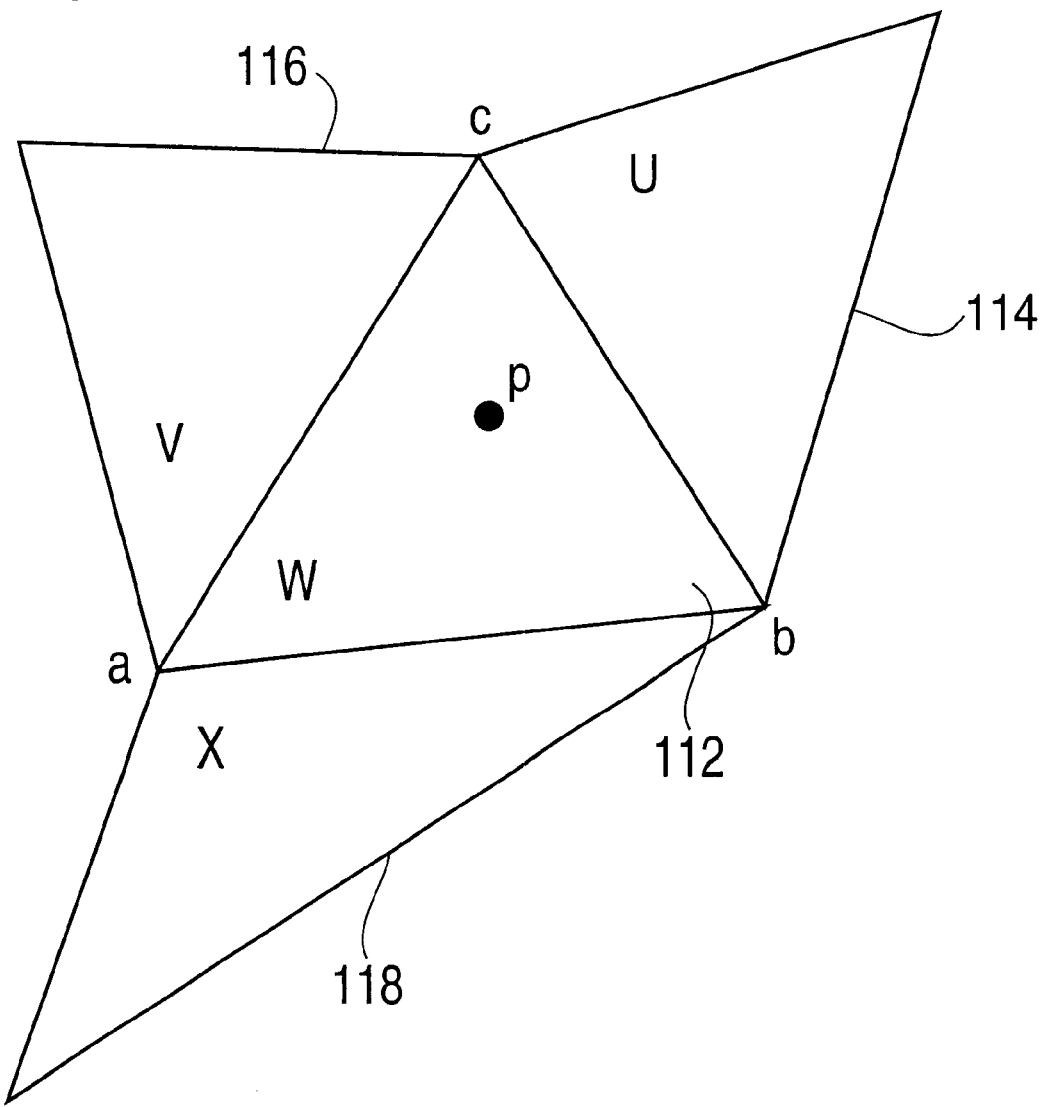
FIG. 11 illustrates triangles used in weighted stamp compensation.

Weighted compensation is computed as follows. At each vertex, the estimated distortion is given as the arithmetic mean of that of the triangle under the center of the stamp (the current triangle) and that of the two triangles adjacent to it who share the vertex. Double weight is assigned to the current triangle when computing the mean. For example, in FIG. 11, the triangles affecting vertex c are W (the current triangle 112), U (the triangle on the right 114,) and V (the triangle on the left 116) The distortion matrix $M_c$ at vertex c is therefore:

$$M_c = \frac{2M_W + M_U + M_V}{4} \quad (60)$$

For a stamp centered at point p in triangle W 112, having barycentric coordinates (u,v,w) with respect to the vertices a,b,c of triangle 112 (i.e., p=ua+vb+wc), the distortion matrix, $M_p$ at p is computed as the barycentric combination of the estimated vertex distortion:

$$M_p = uM_a + vM_b + wM_c \quad (61)$$

$$= \frac{2M_W + (1-u)M_U + (1-v)M_V + (1-w)M_X}{4} \quad (62)$$

It is sometimes the case that a triangle has no adjacent neighbor across one of its edges. In this case, the distortion of the current triangle is substituted for that of the missing neighbor. That is, if triangle X (the bottom triangle 118) was missing from FIG. 11, the distortion at the vertex a would be computed as:

$$M_a = (3M_w + M_v)/4 \quad (63)$$

The process described above requires finding the unique polygon that lies under the mouse pointer to compute its distortion compensation. This follows the assumption that all polygons along the path of the cursor will be hit. Unfortunately, this may not always be the case as sliver triangles and those with sub-pixel extent may be overlooked by the algorithm and ignored. Fortunately this is not a grave problem, as the process of painting is incremental in nature. The workflow typically consists of painting several strokes, then rotating the object, and painting several more. Textures are often touched up and painted directly regardless of the paint mode. In this way, all the required triangles will eventually get painted.

The present invention has been described with respect to the texture space and world space tessellations being triangles, however, it is possible for the tessellations to be any shape polygon. When the tessellated polygons are quadrilateral, the shape distortion compensation may be computed using a projective surface parameterization. Conformal maps may be used to compute the compensation factor for polygons of any degree.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A process for updating a given texture, given a surface that is tessellated into polygons and is texture mapped with the given texture, the surface having a pre-existing representation in 3D space and a corresponding pre-existing representation in texture space, and given a paint stamp target shape on the surface, comprising:

determining a polygon which lies under the paint stamp target shape;

determining a transformation that transforms the polygon into the polygon's representation in texture space; and warping a source paint stamp to match the shape that would be obtained by transforming the paint stamp target shape by the transformation, and applying the warped paint stamp to the texture.

2. A process as recited in claim 1, wherein the transformation provides a linear transformation mapping vertices of the polygon under the paint stamp target shape to vertices of the polygon's representation in texture space.

3. A process as recited in claim 1, wherein said determining a transformation comprises:

constructing a planar orthonormal frame in 3D space;

determining a 3D space vector matrix of directed edges of the polygon under the paint stamp target shape;

inverting the 3D space vector matrix;

determining a texture space vector matrix of directed edges of the polygon's representation in texture space; and multiplying the inverted 3D space vector matrix and the texture space vector matrix.

4. A process as recited in claim 1, wherein said determining a transformation comprises producing a coordinate frame having an orientation of the polygon's representation in texture space matching an orientation of the polygon under the paint stamp target shape, with the origin fixed.

5. A process as recited in claim 1, wherein the polygon's representation in texture space has a transformation matrix and said determining a transformation comprises providing a weighted average matrix of the matrices of a target polygon and three nearest neighbors of the target polygon.

6. A process as recited in claim 5, wherein the weighted average includes a double weight for the target polygon.

7. A computer implemented paint stamp compensation process, comprising:

determining a transformation that transforms an arbitrary three-dimensional polygon into the polygon's preexisting representation in texture space to correct shape and rotational distortion in a paint stamp in stamp space;

changing attributes of a paint stamp using the transformation;

using the attributes to make a source image;

warping, without human processing, the source image before copying the source image to a texture polygon; and mapping the texture polygon to a world space polygon.

8. A computer generated paint stamp compensation process, comprising:

producing a coordinate frame having an orientation of a texture space polygon in a plane of a corresponding world space polygon;

determining a transformation that transforms an arbitrary three-dimensional polygon into the polygon's pre-existing representation in texture space by determining a linear transformation that transforms vertices of the world space polygon to vertices of the texture space polygon, comprising:

constructing a planar orthonormal frame;

determining directed edges of the texture space polygon;

forming a texture space vector matrix from the directed edges of the texture space polygon;

determining directed edges of the world space polygon;

forming a world space vector matrix from the directed edges of the world space polygon;

inverting the world space vector matrix; and multiplying the inverted world space vector matrix and the texture space vector matrix;

providing a weighted average of the transformation of a target polygon and those of three nearest neighbors of the target polygon, the weighted average including a double weight for the target polygon;

using the weighted average to transform a paint stamp in stamp space when creating a source image which is copied to the texture space polygon; and mapping the texture space polygon to the world space polygon.

9. A system for compensating computer generated paint applied to a 3D computer model, comprising:

a display displaying the model;

an input device indicating where paint from a paint stamp space is to be applied to the model; and a computer coupled to said display and said input device, determining a transformation that transforms an arbitrary three-dimensional polygon into the polygon's pre-existing representation in texture space by producing a paint stamp shape and rotational compensation transformation for paint to be applied to the model, compensating the paint with the transformation before the paint is applied to a texture polygon in texture space and mapping the texture polygon to a model polygon in world space.

10. A storage medium including a computer implemented process of determining a transformation that transforms an arbitrary three-dimensional polygon into the polygon's pre-existing representation in texture space by transforming vertices of a world space polygon to vertices of a texture space polygon while rotating the polygons into planar coincidence, uses the transformation to construct a computer generated image of a paint stamp in stamp space which is copied to the texture space polygon, and maps the texture polygon to the world space polygon.

11. A stamp compensation process for a computer generated paint, comprising:

producing a paint compensation transformation by determining, via a computer algorithm, a transformation that transforms an arbitrary three-dimensional polygon into the polygon's pre-existing representation in texture space to compensate for shape, size and rotation distortion of paint, from a paint stamp space, to be applied to a model;

compensating the paint with the computer algorithm determined transformation before the paint is applied to a texture polygon in texture space; and mapping the texture polygon to a model polygon in world space.

12. A computer implemented paint stamp compensation process, comprising:

produicng, via a computer algorithm, paint compensation transformations for paint from a paint stamp space to be applied to a model by determining a transformation that transforms an arbitrary three-dimensional polygon into the polygon's pre-existing representation in texture space;

providing a weighted average of the transformations of a target polygon and those of three nearest neighbors of the target polygon;

using the weighted average to transform a paint stamp in stamp space when creating a source image which is copied to the texture space polygon; and mapping the texture space polygon to the world space polygon.

* * * * *

UNITED STATES PATENT AND TRADEMARK OFFICE
CERTIFICATE OF CORRECTION

PATENT NO. : 6,384,835 B1  
DATED : May 7, 2002  
INVENTOR(S) : Jesse Chaim Reiter et al.

It is certified that error appears in the above-identified patent and that said Letters Patent is hereby corrected as shown below:

Column 2,  
Line 26, after "distortion" insert -- . --

Column 5,  
Line 5, delete "$W'^1$" and insert -- $W'_1$ --

Column 6,  
Line 13, delete $\left(\dfrac{t1}{t2}\right)$ and insert -- $\begin{pmatrix} t_1 \\ t_2 \end{pmatrix}$ --

Column 7,  
Line 35, delete $f_1^{\,2}$ and insert -- $f_2^1$ --

Signed and Sealed this

Twenty-second Day of October, 2002

Attest:

JAMES E. ROGAN  
Attesting Officer  *Director of the United States Patent and Trademark Office*